United States Patent
Andrei et al.

(10) Patent No.: US 9,665,609 B2
(45) Date of Patent: May 30, 2017

(54) GARBAGE COLLECTION OF MULTI-VERSION CONCURRENCY CONTROL (MVCC) DATA BLOCKS

(71) Applicants: Mihnea Andrei, Issy les Moulineaux (FR); Ivan Schreter, Mannheim (DE); Amarnadh Sai Eluri, San Francisco, CA (US)

(72) Inventors: Mihnea Andrei, Issy les Moulineaux (FR); Ivan Schreter, Mannheim (DE); Amarnadh Sai Eluri, San Francisco, CA (US)

(73) Assignee: SAP SE, Walldorf (DE)

( * ) Notice: Subject to any disclaimer, the term of this patent is extended or adjusted under 35 U.S.C. 154(b) by 381 days.

(21) Appl. No.: 14/553,901

(22) Filed: Nov. 25, 2014

(65) Prior Publication Data

US 2016/0147449 A1    May 26, 2016

(51) Int. Cl.
    *G06F 17/30* (2006.01)
(52) U.S. Cl.
    CPC .............................. *G06F 17/30348* (2013.01)
(58) Field of Classification Search
    CPC ......... G06F 17/30356; G06F 17/30348; G06F 17/30353; G06F 17/30351; G06F 17/3023; G06F 17/30168; G06F 17/30377
    See application file for complete search history.

(56) References Cited

U.S. PATENT DOCUMENTS

| | | | | |
|---|---|---|---|---|
| 2005/0198088 A1* | 9/2005 | Subramoney | ..... | G06F 17/30348 |
| 2009/0271435 A1* | 10/2009 | Yako | ............... | G06F 17/30356 |
| 2011/0252000 A1* | 10/2011 | Diaconu | ........... | G06F 17/30501 |
| | | | | 707/638 |
| 2012/0005406 A1* | 1/2012 | Hutchison | ........... | G06F 12/0246 |
| | | | | 711/103 |
| 2015/0120687 A1* | 4/2015 | Bhattacharjee | ... | G06F 17/30362 |
| | | | | 707/704 |

\* cited by examiner

*Primary Examiner* — James Trujillo
*Assistant Examiner* — Aida Tessema
(74) *Attorney, Agent, or Firm* — Sterne, Kessler, Goldstein & Fox P.L.L.C.

(57) ABSTRACT

Disclosed herein are system, method, and computer program product embodiments for performing garbage collection in a database management system with a multi-version concurrency control. An embodiment operate by qualifying a multi-version concurrency control (MVCC) block for garbage collection, where the MVCC block includes multiple cells, each cell corresponding to a row of a table that was acted on by a transaction. Determining that the MVCC block can be garbage collected based on MVCC information in the MVCC block, where the MVCC information includes information that determines whether changes made to rows in the multiple cells are visible in a database management system. Based on the determining, garbage collecting the MVCC block.

20 Claims, 7 Drawing Sheets

GARBAGE COLLECTION OF MULTI-VERSION CONCURRENCY CONTROL (MVCC) DATA BLOCKS

BACKGROUND

Data frequently changes in the rows of tables of a database management system. Concurrency control (CC) protocols are designed to maintain consistency during these data changes, as well as improve the throughput of a database management system. One way to maintain CC is to maintain a lock on data in a database table when data is being manipulated by one or more threads in the database management system. The lock prevents conflicting operations, such as a read and a write on the same row of a table. Another way to maintain CC is to maintain a snapshot of a table in the database management system, where a snapshot is created at a particular time. The one or more threads may then manipulate data from the same snapshot of the table.

A multi-version concurrency control (MVCC) is a CC mechanism that uses the snapshot mechanism. In the MVCC when a read thread reads a row from a table, the write thread may write to the row in the table without being blocked by the read thread. For example, when a read thread reads the data from a row in a table at the same time as the write thread updates or deletes the data from the row, the read thread will use the old copy of the data in the row. In another example, when the first write thread deletes or updates the data in the row, there is a second write thread that is already using the data in the row, and the first write thread will wait until the second write thread completes before modifying the row. Alternatively, the changes made by the first write thread may be removed or rolled back. Since data constantly changes in table 202, a database management system keeps track of multiple versions without impacting memory space. One way to reduce the memory space occupied by the multiple versions of the data is to implement garbage collection on the MVCC data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for garbage collecting MVCC blocks when changes to the rows that are associated with MVCC information in the MVCC blocks are visible to the threads in the database system. Garbage collection of the MVCC data is a critical component of the database management system that uses a read snapshot timestamp based concurrency control mechanisms. Also, garbage collection of MVCC data improves the access time for retrieving the required MVCC information due to the reduced memory foot print of the MVCC data.

Figure 1:
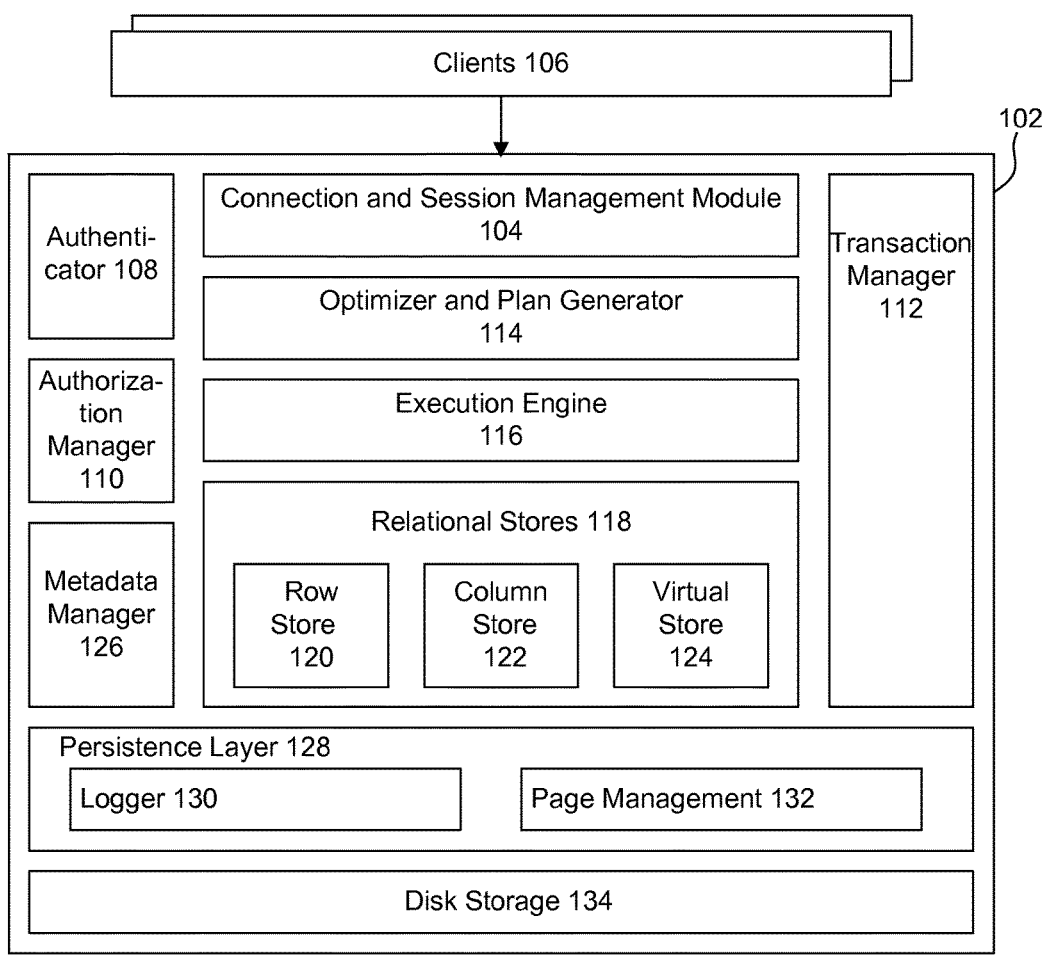
FIG. 1 is a block diagram of a database management system, according to an example embodiment.

FIG. 1 is a block diagram 100 of an exemplary database management system. Database management system 102 may be a memory-centric data management system that leverages hardware capabilities, such as vast main memory space and multi core CPU and GPU processors, described in detail in FIG. 6.

In an embodiment, database management system 102 includes a connection and session management module 104. Connection and session management module 104 creates and manages sessions and connections for database clients or simply clients 106. Clients 106 may be computing devices under the control of a user (also referred to as client devices) that access and/or execute business applications. Business applications are custom or generic applications that include applications related to social media, bio-informatics, and business processing, to name a few examples, and that store and manipulate data in database management system 102.

Once connection and session management module 104 establishes a session with database management system 102, clients 106 may use one or more database languages, to manipulate data. Database languages include a structured query language (SQL), SQL Script (a scripting language for describing application specific calculations inside the database), a MultiDimensional eXpressions (MDX), WIPE (weakly structure information processing and exploration) for data graph processing, and FOX (for planning applications), to give a few examples.

In an embodiment, an established connection may be authenticated using authenticator 108. Authenticator 108 authenticates clients 106 to database management system 102. For example, authenticator 108 verifies that a user using client 106 has a necessary user name and password to access data in database management system 102.

In an embodiment, database management system 102 includes an authorization manager 110. Authorization manager 110 determines whether a user has the required privileges to execute the requested operations. A privilege grants a right to perform a specified operation (such as create, update, select, or execute).

Transaction manager 112 is a component that coordinates transactions, controls transactional isolation and keeps track of active and permanent transactions. In an embodiment, active transactions can be temporary transactions and permanent transactions are committed transactions.

In an embodiment, client 106 may issue a client request to database management system 102. The client request may manipulate one or more rows in a table of a database management system 102. For example, the client request may insert, update or delete data to or in a particular row of a table.

When database management system 102 receives a client request, the client request may initially be processed in accordance with the language of the client request, such as, SQL, SQL script, MDX, WIPE, FOX, etc. For example, a client request including a SQL statement may be processed using a SQL processor (not shown). The SQL processor processes structured data, such as row-and column-oriented physical representations of relational tables in database management system 102.

In another example, a WIPE statement may be processed using a graphics processor that processes unstructured data that is stored as data graphs.

After the initial processing, the client request may be converted into a format that is common to processing requests in database management system 102 and forwarded to an optimizer and plan generator 114. In an embodiment, optimizer and plan generator 114 parses and optimizes the client requests. For example, optimizer and plan generator 112 may generate an execution plan for executing the client request in database management system 102. Once generated, optimizer and plan generator 114 passes the execution plan to execution engine 116.

In an embodiment, execution engine 116 processes the execution plan. To process the execution plan, execution engine 116 accesses data stored in tables of database management system 102. Example tables may be stored in relational stores 118. Relational stores 118 may include a row store 120 and a column store 122. In an embodiment, relational stores 118 may be included in one or more memory structures that are discussed in detail in FIG. 6.

In an embodiment, row store 120 stores relational tables in a row format.

In an embodiment, column store 122 stores relational tables in a column format.

In an embodiment, relational store 118 also includes a virtual store 124. Virtual store 124 is a virtual relational data store that provides access to remote data in external systems through virtual tables. These virtual tables can be accessed through virtual store 124 using, for example, SQL statements.

In an embodiment, metadata manager 126 manages metadata in database management system 102. Example metadata includes definitions of relational tables, columns, views, indexes and procedures. In an embodiment, metadata manager 126 may be coupled to a database catalog for relational stores 118. In one embodiment, the database catalog may be stored in tables in row store 120.

In an embodiment, persistence layer 128 provides durability and atomicity to transactions. For example, persistence layer 128 ensures that data in database management system 102 is restored to the most recent committed state after a restart and that transactions are either completely executed or completely undone. To achieve this goal in an efficient way, persistence layer 128 may use a combination of write-ahead logs, shadow paging and savepoints. In an embodiment, persistence layer 128 also offers interfaces for writing and reading persisted data.

In an embodiment, persistence layer 128 includes a logger 130. Logger 130 logs data, changes in data, and transaction requests to a memory storage disk. Those transactions and data changes may be performed by execution engine 116.

Page management module 132 provides an interface for writing and reading data from memory cache and disk storage for processing from row store 118.

Disk storage 134 is a long term memory storage that stores data. For example, data stored in row stores 118 that is no longer frequently accessed may be moved to disk storage 134. Exemplary disk storage 134 may be one of non-volatile memories that are discussed in detail in FIG. 6. When client 106 requests data in disk storage 134, database management system 102 may move the data from disk storage 134 into row store 118. Once moved, the database management system 102 may send the data to client 106 as part of a response message.

Figure 2:
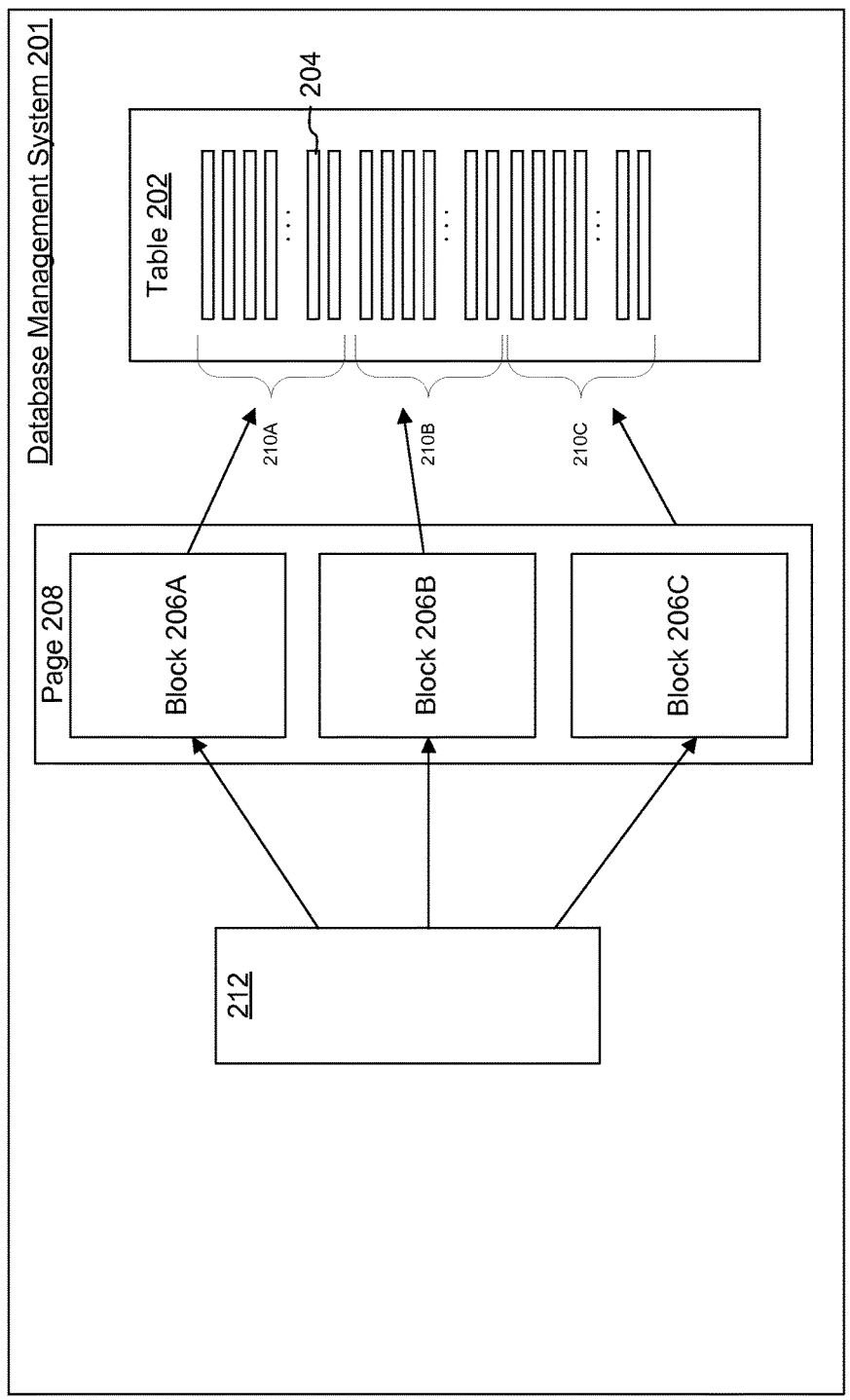
FIG. 2 is a block diagram of a database management system with a multi-version concurrency control, according to an example embodiment.

FIG. 2 is a block diagram 200 of a database management system 201 that includes MVCC logic, according to an embodiment. Database management system 201 may include some or all components of database management system 102. In FIG. 2, database management system 201 includes tables 202. In an embodiment, table 202 may be a combination of one or more tables. For example, table 202 may be an in-memory table that is stored in volatile memory discussed in detail in FIG. 6. In another example, table 202 may be a disk-resident table that is stored in non-volatile memory discussed in detail in FIG. 6. In an embodiment, a disk-resident table may have a subset of pages that are also included in volatile memory. In yet another embodiment, table 202 may be a hybrid table. A hybrid table may include an in-memory component and a disk-resident component. For example, in a hybrid table, pages that include newly inserted and updated rows may be stored in an in-memory component and pages that store data that is read by database management system 201 may be stored in a disk resident component.

In an embodiment, table 202, whether an in-memory table, a disk-resident table or a hybrid table may be associated with one or more MVCC blocks. A hybrid table may be associated with one or move MVCC blocks for an in-memory component and one or more MVCC blocks with a disk-resident component. MVCC blocks are discussed below.

Table 202 includes multiple rows 204. When client 106 issues instructions that manipulate data in database management system 201, these instructions may manipulate data in rows 204 of a table 202. Example instructions include insert, update, or delete operations on rows 204.

In an embodiment, one or more instructions may be referred to as transactions. In a further embodiment, transactions issued by client 106 are active transactions. The changes that active transactions make to rows 204 of table 202 are temporary in database management system 201. Active transactions become permanent transactions when client 106 issues a "commit" instruction. Upon a "commit" instruction, the data changes made to rows 204 of table 202 become permanent and visible to other threads in database management system 201 that manipulate table 202. In a further embodiment, after the "commit" instruction, the data changes to rows 204 become visible based on the read snapshot timestamp. The read snapshot timestamp is a copy of a system timestamp at the time of the beginning of the transaction. A person skilled in the art will appreciate that a thread is a set of instructions that are managed by database management system 201 and perform a specified task. The examples using threads in FIGS. 1-6 are for demonstrative purposes only, and the subject matter is not limited to threads.

In an embodiment, multiple threads in database management system 201 may access data in the same row 204 of table 202. For example, multiple clients 106 can issue requests that manipulate data in the same row of a same table. This causes a thread associated with a particular client 106 to perform transactions on the same row 204 in parallel with other threads for other clients 106. Because multiple threads manipulate the same row 204 in table 202, database management system 201 uses MVCC logic to determine the correct value for the row in table 202 based on the read snapshot timestamp after multiple threads complete manipulating the data in row 204 and commit transactions. In an embodiment, after transactions are "committed" the changes to rows 204 in table 202 become permanent. For example, rows 204 with data that is inserted or updated in table 202 become visible to multiple threads and rows 204 with data that is deleted become invisible to multiple threads.

In an embodiment, to track changes to rows 204 database management system 201 includes MVCC blocks 206 or blocks 206. Blocks 206 may be stored in a memory page 208. Memory page 208 may be one of the memories discussed in detail in FIG. 6. In FIG. 2, blocks 206 are represented by exemplary blocks 206A-206C. Blocks 206 include MVCC information for rows 204 of table 202 having a particular range of rows 210. In an embodiment, blocks 206 include multiple cells, where each cell stores MVCC information for a particular row 204.

In an embodiment, the MVCC information includes creation timestamps and deletion timestamps for rows 204 that represent the commit timestamp of the transaction that inserted or deleted the row. In a further embodiment, the MVCC information also includes row state information for rows 204, where the row state determines whether the changes made to rows 204 are visible to other threads in database management system 201. Example row state information includes states such as "visible," "invisible," "check creation timestamp" to determine visibility, and "check creation and deletion timestamp" to determine visibility.

In an embodiment, range of rows 210 may be a range of row positions for rows 204 in table 202 or range of positions of rows 204 in another storage container, though the implementation is not limited to these embodiments. In FIG. 2, range of rows 210 includes range of rows 210A-C, where range of rows 210A includes rows 204 having row positions 1-1023, range of rows 210B includes rows 204 having row positions 1024-2047, and range of rows 210C includes rows 204 having row positions 2048-3071. In a further embodiment, block 206A stores MVCC information for rows 204 having range of rows 210B, block 206B stores MVCC information for rows 204 having range of rows 210B, and block 206C stores MVCC information for rows 204 having range of rows 206C. A row position is a physical location of a row in memory storage. For example, a row position gives a physical location of a row. Row position can also be an index into the vector holding the rows.

Figure 3A:
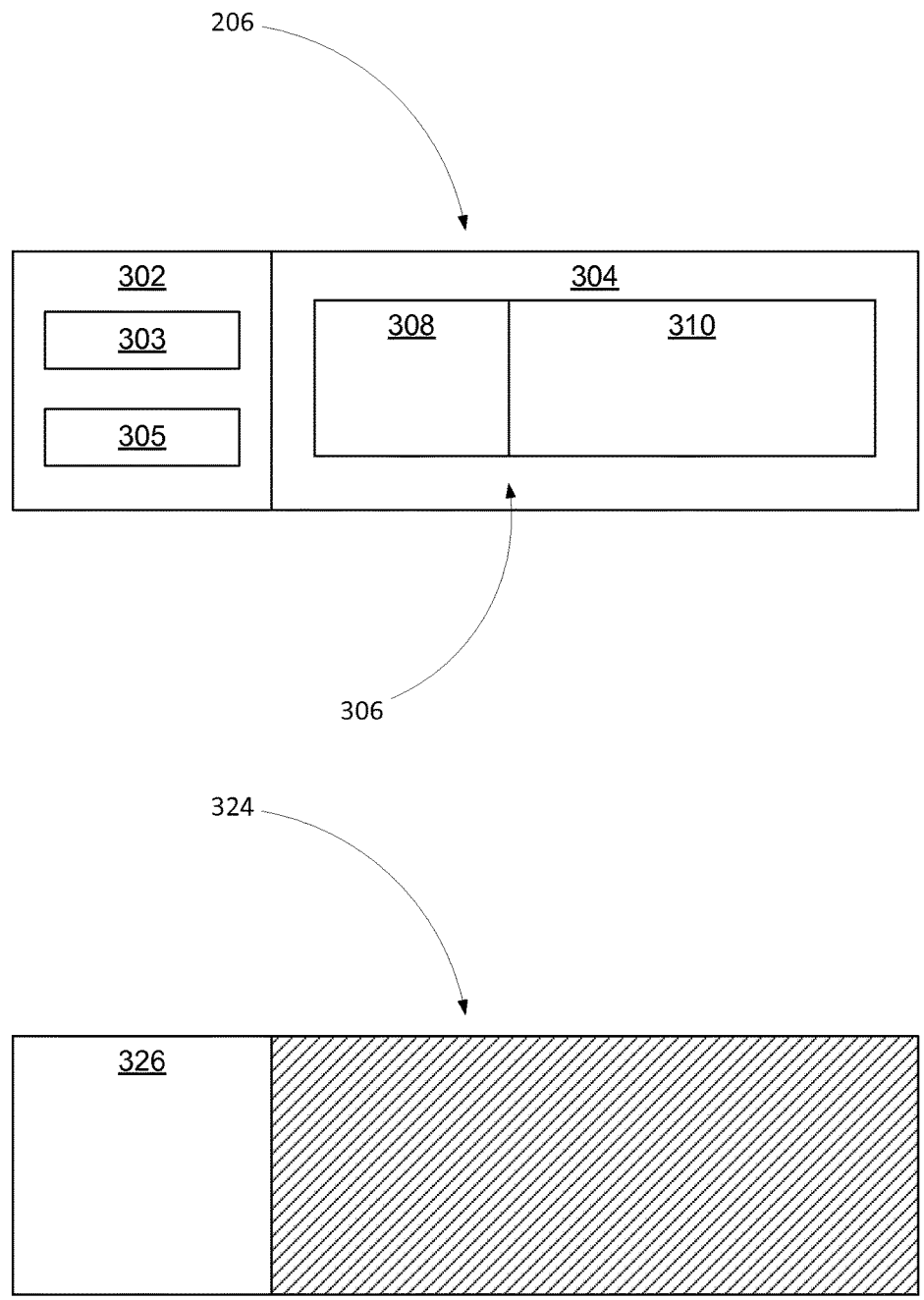
FIG. 3A is a block diagram of a MVCC block and a stub block, according to an embodiment.

FIG. 3A is a block diagram 300A of block 206, according to an embodiment. Block 206 covers a predetermined number of rows 204. In an embodiment, block 206 may store MVCC information that includes creation or deletion timestamps for a range of row positions of rows 204 of table 202. In an embodiment, block 206 can be created from the data base page in such a way that the number of entries in the block is in powers of 2. In an embodiment, block 206 size may be 8K plus a size of a header section 302. In a further embodiment, blocks 206 holding the rows can be an independent database page or can be created out of the database page. Block 206 is initialized with a number of active entries based on the size of the block 206 and the counter is modified while garbage collecting the timestamp entries, as described below.

Block 206 may include a header section 302 and a data section 304. In an embodiment, header section 302 includes header information, such as, a starting row position of row 204 in table 202. In an embodiment, the first MVCC timestamp in data section 304 is associated with row 204 having the starting row position in table 202. For example, in block 206A, the starting row position is 1, in block 206B the starting row position is 1024, and in block 206C the starting row position is 2048.

In an embodiment, header section 302 also includes a type of block information or block type. A block type indicates whether block 206 is a creation timestamp block or a deletion timestamp block. For example, a creation timestamp block stores commit timestamp information of transactions that inserted rows 204 of table 202 by instructions issued by client(s) 106, and a deletion timestamp block stores commit timestamp information of transactions that deleted rows 204 of table 202 by instructions issued by client(s) 106.

In an embodiment, header section 302 also includes metadata. The metadata includes information on data section 304 of block 206. Example metadata information includes an active cell counter 305. Active cell counter 305 stores information on a number of active entries in block 206. A number of active entries represents a number of slots or entries in block 206 that can be issued for storing MVCC timestamps, that is, cells in block 206 that have not been garbage collected by a thread, as described below and is initialized while allocating the block. A person skilled in the art will appreciate that garbage collection frees resources in a database management system 201, so that the resources can be used or reused by other components in the system.

In an embodiment, header section 302 also includes a block minimum timestamp 303. Block minimum timestamp 303 corresponds to a minimum timestamp stored in block 206. In an embodiment, block minimum timestamp 303 may be updated when a thread writes an MVCC timestamp into block 206. Database management system 201 uses block minimum timestamp 303 to determine whether block 206 may be garbage collected as described below.

Additional metadata may include block size of block 206, data section size of data section 304, and range of rows 210, to name a few examples.

Figure 3B:
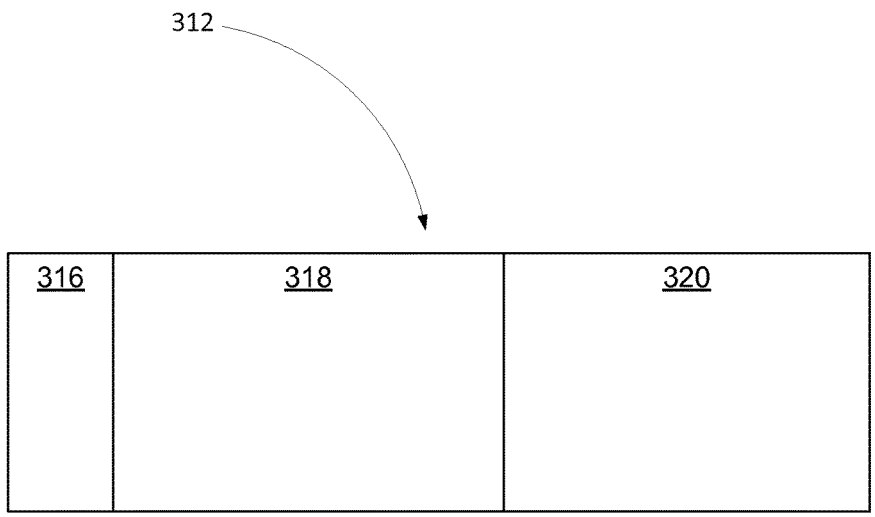
FIG. 3B is a block diagram of an MVCC timestamp, according to an embodiment.
Figure 3B:
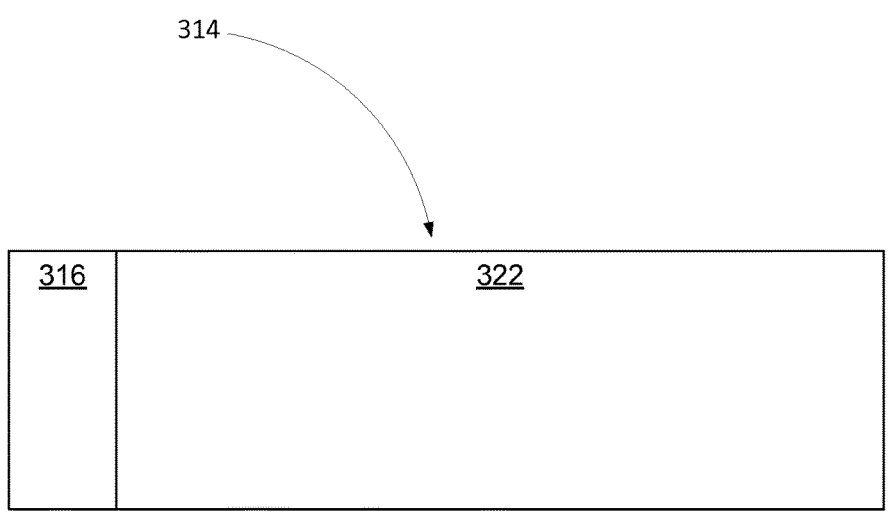

In an embodiment, data section 304 of block 206 stores MVCC information 306 for one or more rows 204 of table 202, one cell of MVCC information 306 per row 204. Example MVCC information 306 includes an MVCC timestamp 310. MVCC timestamp 310 may store a temporary timestamp or a commit timestamp. FIG. 3B is a block diagram 300B of an MVCC timestamp, according to an embodiment. Block diagram 300B includes temporary timestamp 312 and a commit timestamp 314.

In an embodiment, temporary timestamp 312 may be inserted by a thread that process instructions from client 106 before a transaction is committed. Temporary timestamp 312 may include a type indicator 316, a transaction control block index 318 and a statement sequence number 320.

In an embodiment, type indicator 316 indicates whether MVCC timestamp is temporary timestamp 312 or commit timestamp 314.

In an embodiment, transaction control block index 318 is an index that points to a transaction block or another memory space associated with the inserted or deleted transaction before the transaction is committed. The transaction block may store a timestamp that the transaction was inserted or deleted, or an initialization value for a timestamp.

In an embodiment, statement sequence number 320 stores the sequence number associated with a cursor that is included in database management system 201. A person skilled in the art will appreciate that a cursor is a control structure that facilitates a traversal of rows 204 in table 202.

In an embodiment, commit timestamp 314 stores a value of a commit timestamp of a transaction. A commit timestamp may be a creation timestamp or a deletion timestamp. A commit timestamp may be a timestamp of when a thread that process instructions from client 106 commits a transaction that inserts or deletes a row is committed.

In an embodiment, commit timestamp 314 also includes a type indicator 316 and a timestamp 322. Timestamp 322 includes a value for the time the transaction was committed in database management system 201.

In an embodiment, MVCC timestamp 310 may be 64 bits. As temporary timestamp 312 and commit timestamp 314 are types of MVCC timestamp 310, temporary timestamp 312 and commit timestamp 314 may also be 64 bits.

In an embodiment, type indicator 316 may be a one bit indicator that may be set to zero to indicate temporary timestamp 312 and one to indicate commit timestamp 314.

In an embodiment, transaction control block index 318 may be 31 bits, and statement sequence number may be 32 bits.

In an embodiment, timestamp 322 may be 63 bits.

In an embodiment, data section 304 of block 206 may have a memory size of eight kilobytes.

Going back to FIG. 2, in an embodiment, threads in database management system 201 uses a lockless index to access MVCC information 306. The lockless index maps the row position of row 204 to block 206. Multiple threads may use the lockless index to access block 206 at the same time and without a lock mechanism that allows access of a single thread to a resource at a time. For example, a lockless index allows multiple threads to access MVCC information 306 for row 204 at the same time. In an embodiment, lockless access of MVCC information 306 may occur because MVCC information 306 is of an atomic data type. An atomic data type allows threads a lockless and simultaneous read and write access to a resource, such as, MVCC information 306.

In an embodiment, database management system 201 also includes an index structure implemented using versioned vector 212. Versioned vector 212 provides lockless access to blocks 206, or other blocks associated with a range of position values.

In an embodiment, a thread uses the lockless index to access or mark row state information in a row state block for a particular row 204. The thread may access the row state information to determine whether to check or set a creation timestamp or deletion timestamp in block 206, depending on whether client 106 issued a select or insert or delete instruction. For example, if row state information is set to a "check a creation timestamp," the thread then checks creation timestamp 314 for the corresponding row 204 in block 206. In another embodiment, a thread may access row state information for a row and set the state to "visible" or "invisible" when block 206 is being garbage collected along with setting zero in the timestamp information associated with row, as described below.

In an embodiment, a thread may write instructions for transactions that manipulate one or more rows 204 of table 202 to a transaction log. The transactions may also include information such as a type of operation, a row identifier, a row position, and a table fragment identifier for one or more rows 204 that may be stored in MVCC information 306. Once client 106 commits the transactions, database management system 201 may schedule another thread to traverse the transaction log and modify MVCC information 306. For example, a thread may mark MVCC information 306 for rows 204 with a timestamp of when the transaction was committed. In an embodiment, an instruction also includes a row position of row 204 or another identifier that identifies a position of row 204 in table 202. For each instruction that manipulates row 204 of a transaction, a thread accesses MVCC information 306 of row 204 in block 206, and sets MVCC timestamp 310 to the time that the transaction was committed.

In an embodiment, the changes made to rows 204 by transactions stored in a transaction log may become visible to other threads in database management system 201. For example, transactions become visible when a commit timestamp associated with the transaction log is less than the global read snapshot timestamp. In an embodiment, the global read snapshot timestamp is a timestamp in the system where all versions having timestamp value smaller or equal will be visible to all threads in database management system 201.

In an embodiment, when changes made by the transactions in the file become visible, a thread accesses MVCC information 306 for each row 204 manipulated by the transaction and replaces MVCC timestamp 310 with zeroes. For example, the 64 bit value that stores the creation or deletion timestamp information is replaced with zeroes. In a further embodiment, the thread also marks the row state of the corresponding row 204 in a row state block as "visible" or "invisible," depending on operation type, such as insert or delete.

In an embodiment, block 206 may no longer be required to track the state of rows 204 in table 202 and may be garbage collected. This occurs when the row state in the row state block for all rows 204 is set to "visible" or "invisible," depending on the block type. As discussed above, block 206 also includes active cell counter 305 in block header 302. The active cell counter 305 tracks a number of active cells in block 206. An active cell in block 206 is a cell that includes MVCC timestamp 310 other than zero. When the garbage collection thread sets MVCC timestamp 310 to zero, the thread decrements active cell counter 305. When the number of active entries becomes zero then block 206 is replaced with stub block 324 and block 206 is re-used for another block of rows without blocking any clients operating on the table or the block. There will be no writer to this block because all the entries are garbage collected. In an embodiment, active cell counter 305 determines when block 206 may be garbage collected. For example, when a thread decrements active cell counter 305 to zero, block 206 does not contain MVCC row information 306 that is not visible to database management system 201 and can be garbage collected. For example, when active cell counter 305 of block 206A is equal to zero, changes to rows 204 having row positions 0-1023 are visible to other threads in database management system 201.

Once garbage collected, block 206 can also be reused to store MVCC information 306 for a different range of rows 210 in table 202. For example, block 206A can be garbage collected and set to another range of rows 210 in table 202.

Going back to FIG. 3A, in an embodiment, database management system 201 also includes a stub block 324. Stub block 324 is similar to block 206 but includes a header section 326 and no data section (shown by a shaded section in stub block 324 in FIG. 3A). In an embodiment, header section 326 includes metadata information. In stub block 324 a data section is unavailable and is hooked to a write-protected memory block initialized with zeroes in database management system 201 so that threads are unable to write data to the data section. In a further embodiment, database management system 201 may include a single memory block that may be shared in database management system 201 when blocks 206 were garbage collected. Stub block 324 with write protected memory block resembles a regular timestamp block 206 with fully garbage collected timestamp entries. In an embodiment, block header 302 and 326 may include a block type to differentiate stub block 324 from block 206.

Going back to FIG. 2, in another embodiment, a thread also implements table level garbage collection (not shown) at a table level. In an embodiment, table level garbage collection may be triggered by a SQL command or by internal operations in the data management system or by the merge threads (for hybrid tables) that merged in-memory component of the table with on-disk component or by closing a cursor in database management system 201. In an embodiment, table level garbage collection occurs on tables 202 that are in-memory, disk-resident and hybrid tables in database management system 201.

In the table level garbage collection, a thread traverses all blocks 206, such as blocks 206A-C that store MVCC information 306 for table 202, beginning with block 206 that stores MVCC information 306 associated with the first row starting position. During the traversal, a thread retrieves a block minimum timestamp 303 from header section 302 of block 206. The block minimum timestamp 303 in header section 302 is the minimum timestamp associated with block 206. The thread then compares block minimum timestamp 303 in header section 302 against a table level read snapshot timestamp given to the garbage collection thread. In an embodiment, the table level read timestamp is a read snapshot timestamp. A read snapshot timestamp may be a maximum timestamp of a snapshot associated with a version for which there is an active reader thread and all the versions prior to that do not have a reference in database management system 201. The read snapshot timestamp is a timestamp for which rows 204 in table 202 are treated as always visible for inserted rows or always invisible for deleted rows. That is, a snapshot timestamp is a timestamp of a time for which changes to table 202 was visible to all threads in database management system 201. Based on the comparison, if the block minimum timestamp 303 in header section 302 is greater than the table level timestamp, the thread then skips garbage collection of block 206. If the timestamp in header section 302 is less than or equal to the table level timestamp, then the thread performs garbage collection of block 206 and sets the row state in row state block as "visible" or "invisible" based on MVCC timestamp 310 and block type information.

In another embodiment, garbage collection may also be performed on all blocks 206 without checking for the block minimum timestamp.

Additionally, in an embodiment, even when the thread determines that garbage collection for block 206 may be skipped, block 206 may still include MVCC timestamps 310 that may qualify block 206 for garbage collection. For example, block 206 may include timestamp entries 310 that include a temporary timestamps and can result in commit timestamp less than or equal to snapshot timestamp used by the garbage collection thread.

Once block 206 qualifies for garbage collection, a thread determines a number of active entries in block 206. If the number of active entries in block 206 is zero, then block 206 can be garbage collected without looking at each cell in data section 304 and the thread replaces block 206 with stub block 324.

If the number of active entries in block 206 is not equal to zero, then the thread traverses over MVCC timestamps 310 in data section 304 of block 206. During the traversal, the thread uses type indicator 316 to determine whether MVCC timestamp 310 includes temporary timestamp 312 or commit timestamp 314. If MVCC timestamp 310 includes temporary timestamp 312, then the thread uses the transaction control block index 318 to determine the value of the commit timestamp. Otherwise, the thread queries the value of timestamp 322 in commit timestamp 314.

Once the thread determines the value of the commit timestamp, the thread compares the value of the commit timestamp to the read snapshot timestamp. If the value of the commit timestamp is less than or equal to the read snapshot timestamp, the thread replaces temporary timestamp 312 or commit timestamp 314 with zeroes. In an embodiment, the thread may also update the row state block for the corresponding row position to "visible" or "invisible" depending on whether the commit timestamp corresponds to a creation timestamp or deletion timestamp. In a further embodiment, the thread also tracks the number of processed cells in block 206.

If the value of the commit timestamp is greater than or equal to the read snapshot timestamp, the thread checks block minimum timestamp 303 against the value of the commit timestamp, and updates block minimum timestamp 303, if necessary.

After the thread completes traversing block 206, the thread determines whether the number of processed cells is greater than zero. If the number of processed entries is greater than zero, the thread decreases active cell counter 305 in header section 302 of block 206 by the number of processed cells. If active cell counter 305 is equal to zero, the thread replaces block 206 with stub block 324.

Figure 4:
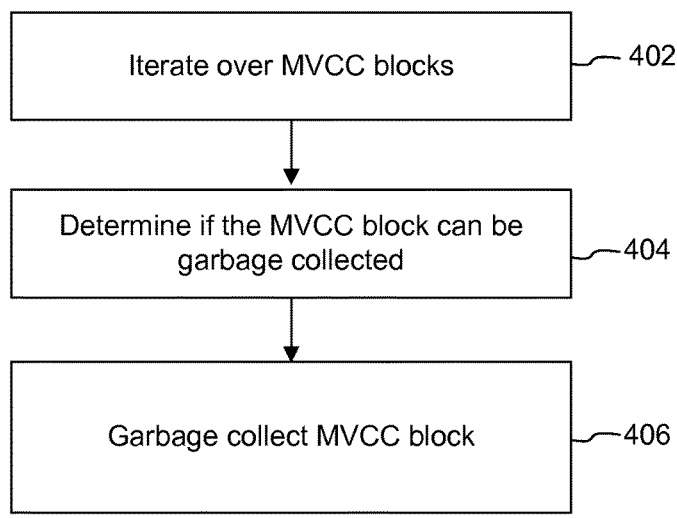
FIG. 4 is a flowchart for a method for determining whether MVCC block can be garbage collected, according to an embodiment.

FIG. 4 is a flowchart for a method 400 for determining if MVCC block can be garbage collected, according to an embodiment. Method 400 can be performed by processing logic that can comprise hardware (e.g., circuitry, dedicated logic, programmable logic, microcode, etc.), software (e.g., instructions run on a processing device), or a combination thereof.

In step 402, a database management system 201 iterates over MVCC blocks.

In step 404, a database management system qualifies MVCC block for garbage collection. As discussed above, to qualify block 206 for garbage collection a thread in database management system 201 determines whether a read snapshot timestamp is less than block minimum timestamp 303 of block 206. As an optimistic approach, if the read snapshot timestamp is less than block minimum timestamp 303 of block 206, the thread does not perform garbage collection on block 206 as block 206 does not qualify for garbage collection. Alternatively, the thread may also qualify block 206 for garbage collection aggressively without checking the block minimum timestamp. If the thread qualifies block 206 for garbage collection, the flowchart proceeds to step 404. Otherwise the flowchart ends.

In step 406, a thread garbage collects the MVCC block based on the determination in step 404. To garbage collect block 206, the thread iterates over cells in block 206, and removes block 206 when all cells have been garbage collected, as discussed in detail in FIG. 5

Figure 5:
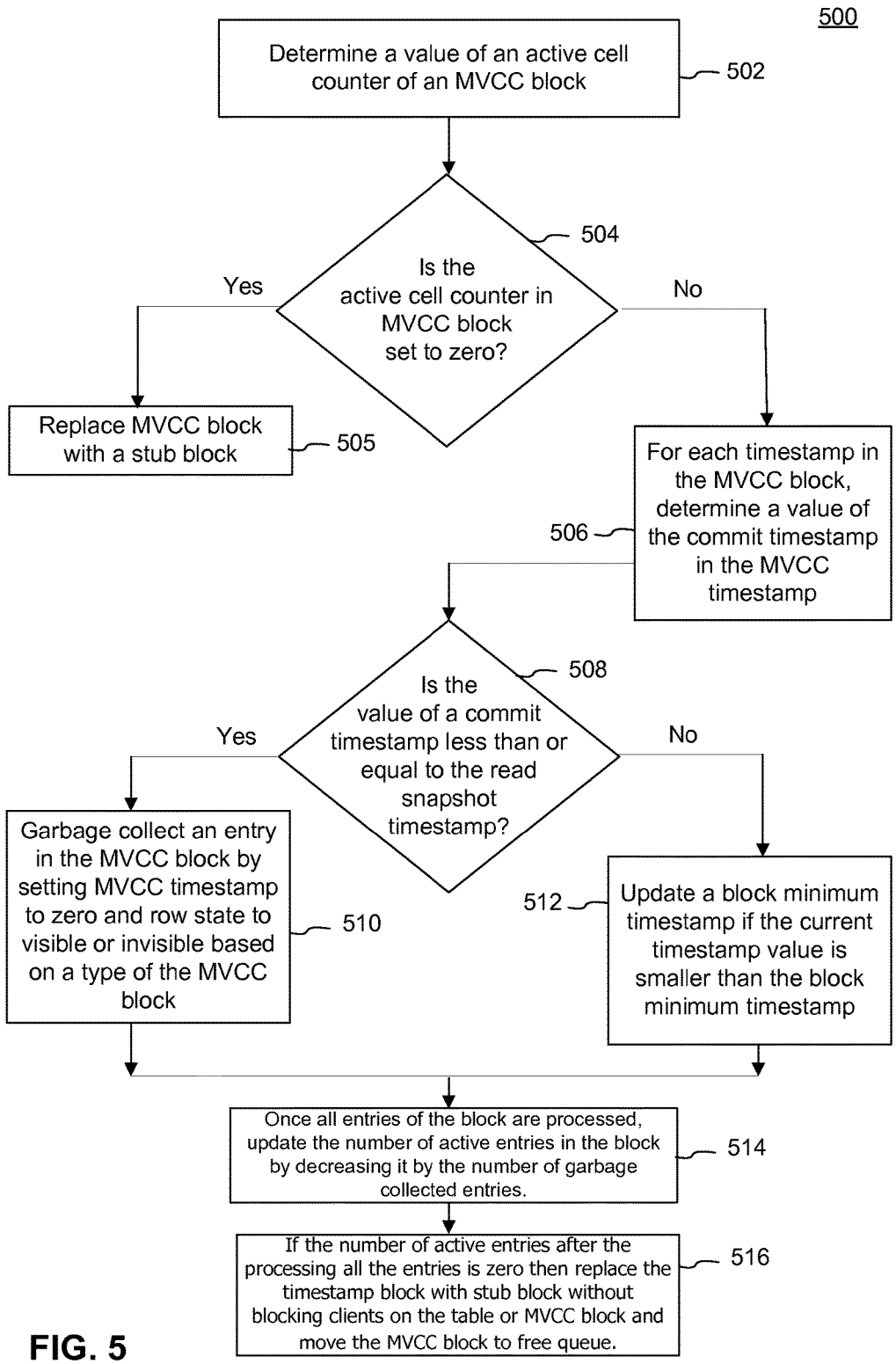
FIG. 5 is a flowchart of a method for garbage collecting an MVCC block, according to an example embodiment.

FIG. 5 is a flowchart for a method 500 for garbage collecting the MVCC block, according to an embodiment. Method 500 can be performed by processing logic that can comprise hardware (e.g., circuitry, dedicated logic, programmable logic, microcode, etc.), software (e.g., instructions run on a processing device), or a combination thereof.

At step 502, a database management system determines the value of an active cell counter of a MVCC block. For example, a thread in database management system 201 determines a value in active cell counter 305 in block 206.

At step 504, a database management system determines if the number of active entries in MVCC block is zero and MVCC block is not a stub block. If the value of active entries is equal to zero and block 206 is not stub block 324, block 206 can be garbage collected and the flowchart proceeds to step 505 where the thread replaces block 206 with stub block 324. Otherwise, the thread proceeds to step 506. The thread performs steps 506 through 510 for each cell in data section 304 of block 206.

At step 506, for each timestamp entry in the block, a database management system determines a value of a commit timestamp. For example, a thread uses type indicator 316 to determine whether a timestamp entry in a cell includes temporary timestamp 312 or commit timestamp 314. If a cell includes temporary timestamp 312, the thread retrieves the value of the commit timestamp using transaction control index 318. Otherwise, the thread retrieves the value of the commit timestamp from timestamp 322 in commit timestamp 314.

At step 508, a database management system compares the value of the commit timestamp against the read snapshot timestamp. If the value of the commit timestamp is less than or equal to the read snapshot timestamp, the flowchart proceeds to step 510. Otherwise, to step 512.

At step 510, a database management system prepares the cell for garbage collection. For example, the thread replaces temporary timestamp 312 or commit timestamp 314 with zeroes, and updates the corresponding row state in the row state block as "visible" or "invisible." In an embodiment, the thread also tracks the cell as a processed cell using a processed cell counter. After step 510, when each cell in block 206 has been processed, the flowchart proceeds to step 514.

At step 512, a database management system updates the block minimum timestamp, as needed. For example, the thread checks block minimum timestamp 303 against the value of the commit timestamp, and updates block minimum timestamp 303 if the value of block minimum timestamp is greater than the value of the current timestamp value. After step 510, when each cell in block 206 has been processed, the flowchart proceeds to step 514.

At step 514, a database management system updates the active cell counter. For example, the thread subtracts a number of entries processed in step 510 from the value in active cell counter 305.

At step 516, a database management system garbage collects the MVCC block. For example, if active cell counter 305 is zero, then the thread replaces block 206 with stub block 324 and moves block 206 to a free queue.

Figure 6:
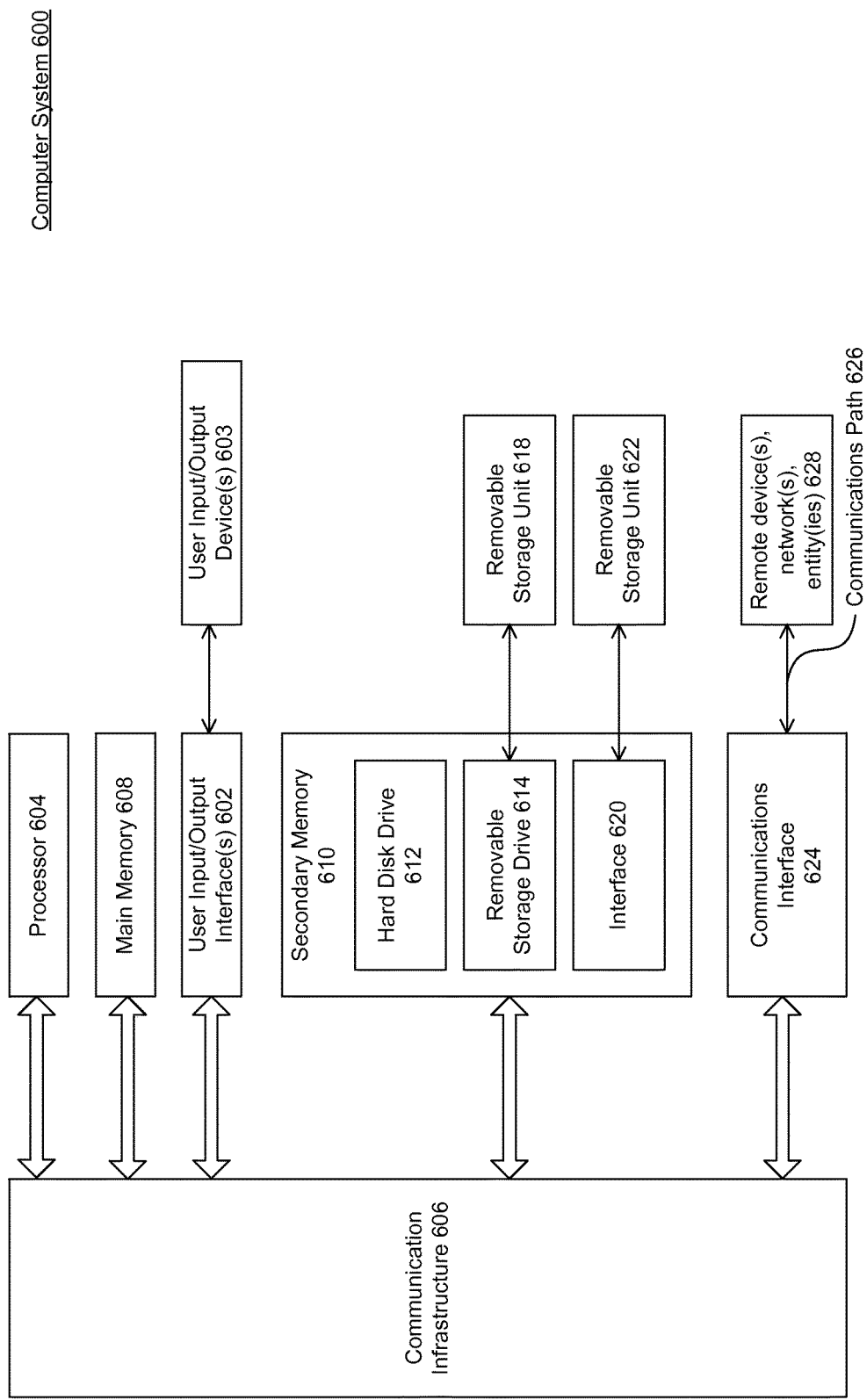
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
    qualifying a multi-version concurrency control (MVCC) block for garbage collection, wherein the MVCC block includes multiple cells, each cell corresponding to a row of a table that was acted on by a transaction;
    determining that the MVCC block can be garbage collected based on MVCC information in a block header of the MVCC block, wherein the MVCC information includes information that determines whether changes made to rows corresponding to the multiple cells are visible in a database management system; and
    based on the determining, garbage collecting the MVCC block.

2. The method of claim 1, wherein the qualifying further comprises:
    determining whether a read snapshot table that corresponds to a time the table was read by a reader thread is less than a block minimum timestamp in the MVCC block.

3. The method of claim 1, wherein the qualifying further comprises:
    determining whether the multiple cells include a cell with a temporary timestamp.

4. The method of claim 1, further comprising:
    subsequent to garbage collecting the MVCC block when there are no active entries in the MVCC block, replacing the MVCC block with a stub block that includes a range of rows that corresponds to row positions of the rows of the MVCC block.

5. The method of claim 1, wherein the determining further comprises:
    determining a value of an active cell counter in the MVCC information of the MVCC block, wherein the active cell counter corresponds to a number of cells in the MVCC block that have not been garbage collected; and
    garbage collecting the MVCC block based on the value of the active cell counter.

6. The method of claim 1, wherein the determining further comprises:
    for each cell in the multiple cells in the MVCC block:
        determining a value of a commit timestamp;
        determining when the value is less than or equal to a read snapshot timestamp; and
        based on the determining that the value is less than or equal to the read snapshot timestamp:
            updating row state information of a row corresponding to the cell as visible or invisible based on an action in the transaction; and
            marking the cell for garbage collection.

7. The method of claim 6, further comprising:
    determining a number of cells marked for garbage collection;
    subtracting the number of cells from the active cell counter in the MVCC information; and
    garbage collecting the MVCC block based on a value of the active cell counter.

8. The method of claim 6, wherein the action is an insert instruction or a delete instruction.

9. The method of claim 1, further comprising:
    for each cell in the multiple cells of the MVCC block:
        determining a value of a commit timestamp;
        determining when the value is greater than a read snapshot timestamp associated with the table; and
        based on the determining that the value is greater than the read snapshot timestamp, updating a block minimum timestamp of the MVCC block with the commit timestamp when the current value of block minimum timestamp is greater than the current commit timestamp.

10. A system, comprising:
    a memory; and
    at least one processor coupled to the memory and configured to:
        qualify a multi-version concurrency control (MVCC) block for garbage collection, wherein the MVCC block includes multiple cells, each cell corresponding to a row of a table that was acted on by a transaction;
        determine that the MVCC block can be garbage collected based on MVCC information in a block header of the MVCC block, wherein the MVCC information includes information that determines whether changes made to rows corresponding to the multiple cells are visible in a database management system; and based on the determination, garbage collect the MVCC block.

11. The system of claim 10, wherein to qualify the MVCC block for garbage collection, the at least one processor is further configured to determine whether a read snapshot table that corresponds to a time the table was read by a reader thread is less than a block minimum timestamp in the MVCC block.

12. The system of claim 10, wherein to qualify the MVCC block for garbage collection, the at least one processor is further configured to determine whether the multiple cells include a cell with a temporary timestamp.

13. The system of claim 10, wherein subsequent to garbage collecting the MVCC block and when there are no active entries in the MVCC block, the at least one processor is configured to replace the MVCC block with a stub block that includes a range of rows that corresponds to row positions of the rows in the MVCC block.

14. The system of claim 10, wherein to determine whether the MVCC block can be garbage collected the at least one processor is configured to:
  determine a value of an active cell counter in the MVCC information of the MVCC block, wherein the active cell counter corresponds to a number of cells in the MVCC block that have not been garbage collected; and
  garbage collect the MVCC block based on the value of the active cell counter.

15. The system of claim 10, wherein to determine whether the MVCC block can be garbage collected the at least one processor is configured to:
  for each cell in the multiple cells in the MVCC block:
    determine a value of a commit timestamp;
    determine if the value is less than or equal to a read snapshot timestamp; and
    based on the determination that the value is less than or equal to the read snapshot timestamp:
      update row state information of a row corresponding to the cell as visible or invisible based on an action in the transaction; and
      mark the cell for garbage collection.

16. The system of claim 15 wherein the at least one processor is configured to:
  determine a number of cells marked for garbage collection;
  subtract the number of cells from an active cell counter in the MVCC information; and
  garbage collect the MVCC block based on a value of the active cell counter.

17. The system of claim 10, wherein the at least one processor is configured to:
  for each cell in the multiple cells of the MVCC block:
    determine a value of a commit timestamp;
    determine when the value is greater than a read snapshot timestamp associated with the table; and
    based on the determination that the value is greater than the read snapshot timestamp, update a block minimum timestamp of the MVCC block with the commit timestamp.

18. A tangible computer-readable device having instructions stored thereon that, when executed by at least one computing device, causes the at least one computing device to perform operations comprising:
  qualifying a multi-version concurrency control (MVCC) block for garbage collection, wherein the MVCC block includes multiple cells, each cell corresponding to a row of a table that was acted on by a transaction;
  determining that the MVCC block can be garbage collected based on MVCC information in a block header of the MVCC block, wherein the MVCC information includes information that determines whether changes made to rows corresponding to the multiple cells are visible in a database management system; and
  based on the determining, garbage collecting the MVCC block.

19. The computer-readable device of claim 18, the operations further comprising:
  determining whether a read snapshot table that corresponds to a time the table was read by a reader thread is less than a block minimum timestamp in the MVCC block.

20. The computer-readable device of claim 18, the operations further comprising:
  determining a value of an active cell counter in the MVCC information of the MVCC block, wherein the active cell counter corresponds to a number of cells in the MVCC block that have not been garbage collected; and
  garbage collecting the MVCC block based on the value of the active cell counter.

* * * * *